US008595764B2

(12) United States Patent
Kikinis et al.

(10) Patent No.: US 8,595,764 B2
(45) Date of Patent: Nov. 26, 2013

(54) IMAGE-ORIENTED ELECTRONIC PROGRAMMING GUIDE

(75) Inventors: Dan Kikinis, Saratoga, CA (US); Rick S. Howe, Darlington, MD (US); Yakov Kamen, Cupertino, CA (US)

(73) Assignee: JLB Ventures, LLC, Washington, DC (US)

( * ) Notice: Subject to any disclaimer, the term of this patent is extended or adjusted under 35 U.S.C. 154(b) by 1659 days.

(21) Appl. No.: 10/072,114

(22) Filed: Feb. 5, 2002

(65) Prior Publication Data

US 2002/0166122 A1    Nov. 7, 2002

Related U.S. Application Data

(63) Continuation-in-part of application No. 09/344,442, filed on Jun. 25, 1999, now Pat. No. 6,342,884, and a continuation-in-part of application No. 09/361,470, filed on Jul. 27, 1999, now Pat. No. 6,456,287, and a continuation-in-part of application No. 09/378,184, filed on Aug. 20, 1999, now abandoned, and a continuation-in-part of application No. 09/378,270, filed on Aug. 20, 1999, now abandoned, and a continuation-in-part of application No. 09/448,361, filed on Jan. 16, 2000, now Pat. No. 6,421,067.

(60) Provisional application No. 60/267,001, filed on Feb. 6, 2001, provisional application No. 60/118,509, filed on Jun. 25, 1998, provisional application No. 60/114,809, filed on Feb. 3, 1999.

(51) Int. Cl.
| | |
|---|---|
| *G06F 3/00* | (2006.01) |
| *G06F 3/048* | (2013.01) |
| *G06T 15/10* | (2011.01) |
| *G06K 9/32* | (2006.01) |

(52) U.S. Cl.
USPC ............. 725/37; 715/782; 715/788; 715/850; 345/427; 382/298

(58) Field of Classification Search
USPC .......... 348/564, 565, 559; 725/39, 43, 52, 58, 725/44, 56
See application file for complete search history.

(56) References Cited

U.S. PATENT DOCUMENTS

| 4,621,259 A | 11/1986 | Schepers et al. |
|---|---|---|
| 4,751,578 A | 6/1988 | Reiter et al. |

(Continued)

FOREIGN PATENT DOCUMENTS

| EP | 0637814 A | 2/1995 |
|---|---|---|
| JP | 1131976 | 5/1989 |

(Continued)

OTHER PUBLICATIONS

Shahraray B.,"Scene Change Detection and Content-Based Sampling of Video Sequences", SPIE vol. 2419, 1995.*

(Continued)

*Primary Examiner* — Chris Parry
*Assistant Examiner* — James R Marandi
(74) *Attorney, Agent, or Firm* — Banner & Witcoff, Ltd.

(57) ABSTRACT

An image-oriented electronic programming guide system is provided in which programming choices are represented as reduced video images of real-time programming displayed in individual image areas comprising one or more independent or geometric surfaces. The reduced video images may be snapshots captured from a standard video channel and updated at regular intervals or after detecting a scene change in the real-time programming. The most presentable snapshot may be further filtered to represent the real-time programming in the best manner. The reduced video images may also be thumbnail video streams selected from an enhanced preview channel.

20 Claims, 7 Drawing Sheets

(56) References Cited

U.S. PATENT DOCUMENTS

| | | |
|---|---|---|
| 4,935,879 A | 6/1990 | Ueda |
| 4,963,979 A * | 10/1990 | Sendelweck ............... 348/554 |
| 4,963,994 A | 10/1990 | Levine |
| 5,038,211 A | 8/1991 | Hallenbeck |
| 5,179,638 A | 1/1993 | Dawson et al. |
| 5,243,418 A | 9/1993 | Kuno et al. |
| 5,293,357 A | 3/1994 | Hallenbeck |
| 5,414,773 A | 5/1995 | Handelman |
| 5,479,268 A | 12/1995 | Young et al. |
| 5,526,034 A | 6/1996 | Hoarty |
| 5,532,754 A | 7/1996 | Young et al. |
| 5,550,576 A | 8/1996 | Klosterman |
| 5,550,578 A | 8/1996 | Hoarty |
| 5,583,560 A * | 12/1996 | Florin et al. .................. 725/40 |
| 5,684,525 A | 11/1997 | Klosterman |
| 5,704,837 A | 1/1998 | Iwasaki et al. |
| 5,737,028 A | 4/1998 | Bertram et al. |
| 5,751,282 A | 5/1998 | Girard et al. |
| 5,808,613 A | 9/1998 | Marrin et al. |
| 5,818,441 A | 10/1998 | Throckmorton et al. |
| 5,828,945 A | 10/1998 | Klosterman |
| 5,841,441 A | 11/1998 | Smith |
| 5,841,563 A | 11/1998 | Effenberger |
| 5,883,640 A * | 3/1999 | Hsieh et al. ................. 345/503 |
| 5,900,915 A | 5/1999 | Morrison |
| 5,914,755 A * | 6/1999 | Ito et al. ...................... 348/552 |
| 5,923,362 A | 7/1999 | Klosterman |
| 5,926,168 A | 7/1999 | Fan |
| 5,929,849 A | 7/1999 | Kikinis |
| 5,940,073 A | 8/1999 | Klosterman et al. |
| 5,956,456 A | 9/1999 | Bang et al. |
| 5,999,167 A | 12/1999 | Marsh et al. |
| 5,999,187 A | 12/1999 | Dehmlow et al. |
| 6,002,403 A | 12/1999 | Sugiyama et al. |
| 6,029,195 A | 2/2000 | Herz |
| 6,034,678 A | 3/2000 | Hoarty |
| 6,057,884 A * | 5/2000 | Chen et al. ............. 375/240.16 |
| 6,061,055 A | 5/2000 | Marks |
| 6,072,983 A | 6/2000 | Klosterman |
| 6,075,575 A | 6/2000 | Schein et al. |
| 6,078,348 A | 6/2000 | Klosterman et al. |
| 6,081,271 A | 6/2000 | Bardon et al. |
| 6,094,237 A * | 7/2000 | Hashimoto .................. 348/731 |
| 6,100,883 A | 8/2000 | Hoarty |
| 6,167,188 A | 12/2000 | Young et al. |
| 6,205,485 B1 | 3/2001 | Kikinis |
| 6,205,582 B1 | 3/2001 | Hoarty |
| 6,233,389 B1 | 5/2001 | Barton et al. |
| 6,243,039 B1 | 6/2001 | Elliot |
| 6,271,831 B1 | 8/2001 | Escobosa et al. |
| 6,331,852 B1 * | 12/2001 | Gould et al. ................. 345/419 |
| 6,405,371 B1 * | 6/2002 | Oosterhout et al. ........... 725/39 |
| 6,411,337 B2 * | 6/2002 | Cove et al. .................... 348/563 |
| 6,549,643 B1 * | 4/2003 | Toklu et al. ................... 382/107 |
| 6,549,669 B1 * | 4/2003 | Sundqvist et al. ............. 382/238 |
| 6,597,358 B2 * | 7/2003 | Miller ........................... 345/427 |
| 6,710,788 B1 * | 3/2004 | Freach et al. ................. 715/778 |
| 6,732,371 B1 * | 5/2004 | Lee et al. ......................... 725/41 |
| 6,784,945 B2 * | 8/2004 | Norsworthy et al. ......... 348/731 |
| 6,870,573 B2 * | 3/2005 | Yeo et al. ...................... 348/569 |
| 7,130,864 B2 * | 10/2006 | Lin et al. .................... 707/104.1 |
| 2002/0069415 A1 * | 6/2002 | Humbard et al. ............... 725/52 |
| 2002/0140805 A1 * | 10/2002 | Gutta et al. .................... 348/40 |
| 2003/0014752 A1 * | 1/2003 | Zaslavsky et al. .............. 725/40 |

FOREIGN PATENT DOCUMENTS

| | | |
|---|---|---|
| JP | 6-20063 | 1/1994 |
| JP | 8305894 | 11/1996 |
| JP | 9147136 | 6/1997 |
| JP | 9265548 | 10/1997 |
| WO | 9827515 A | 6/1998 |
| WO | 9900768 | 1/1999 |
| WO | WO 99/51022 * | 10/1999 |
| WO | WO00/01149 A1 | 1/2000 |
| WO | PCT/US01/12342 | 9/2001 |
| WO | PCT/US01/13897 | 9/2001 |
| WO | PCT/US01/15405 | 10/2001 |
| WO | PCT/US01/41664 | 11/2001 |
| WO | PCT/US01/11666 | 1/2002 |

OTHER PUBLICATIONS

Rosengren et al., "Arrangement and Method for Transmitting and Receiving Video Signals", WIPO, WO 95/28794.*
EP 00 90 5959.3 Search Report dated Mar. 3, 2009.
EP 00 9913354.7 Search Report dated Jun. 12, 2009.
Takaaki Akimoto et al., "3D Facial Model Creation Using Generic Model and Front and Side Views of Face," IEEE Transactions on Information and Systems, Information & Systems Society, Tokyo, JP, vol. E75-D No. 2, Mar. 1, 1992, pp. 191-197 XP000301166.
Brenner C; Haala N, "Fast Production of Virtual Reality City Models," International Archives of Photogrammetry and Remote Sensing, IAPRS, vol. 32, No. 4, 1998, pp. 77-84, XP002529779, printed May 8, 2009.
Sclaroff S, et al., "Generalized Implicit Functions for Computer Graphics," Computer Graphics USA, vol. 25, No. 4, Jul. 1991, pp. 247-250, XP002529780.
Office Action issued Oct. 29, 2009; JP 2000-597760.
Translation of JP 2000-597760 OA Issued May 28, 2010.

* cited by examiner

IMAGE-ORIENTED ELECTRONIC PROGRAMMING GUIDE

REFERENCE TO RELATED APPLICATIONS

This application claims priority based on U.S. Provisional Application 60/267,001, filed Feb. 6, 2001 by Kikinis et al.

This application is further a Continuation-in-Part of U.S. patent application Ser. No. 09/344,442, now U.S. Pat. No. 6,342,884, filed Jun. 25, 1999, and incorporated by reference herein.

This application is further a Continuation-in-Part of U.S. patent application Ser. No. 09/361,470, now U.S. Pat. No. 6,456,287, filed Jul. 27, 1999, and incorporated by reference herein.

This application is further a Continuation-in-Part of U.S. patent application Ser. No. 09/378,184, now abandoned, filed Aug. 20, 1999 by Kamen et al., and incorporated by reference herein, which in turn is a continuation of U.S. patent application Ser. No. 09/344,442, filed Jun. 25, 1999.

This application is further a Continuation-in-Part of U.S. patent application Ser. No. 09/378,270, now abandoned, filed Aug. 20, 1999 by Kamen et al., and incorporated by reference herein, which in turn is a continuation of U.S. patent application Ser. No. 09/344,442, filed Jun. 25, 1999.

This application is further a Continuation-in-Part of U.S. patent application Ser. No. 09/488,361, now U.S. Pat. No. 6,421,067, filed Jan. 16, 2000 by Kamen et al., and incorporated by reference herein.

TECHNICAL FIELD

The present invention relates to the field of electronic programming guides. In particular, the present invention relates to providing images in an electronic programming guide.

BACKGROUND

In the early days of television when a viewer wanted to see what the selections of programming were, he would manually change from one channel to the next by turning a knob on the television set. This was a reasonable thing to do because originally there were only a few channels among which to choose. Cable TV brought an increase in the number of available channels and the accompanying technology of the remote control, which gave the viewer the capability to surf through the channels until he came upon a program that he wanted to watch. With the advent of satellite TV, and the corresponding leap from dozens to hundreds of channels of available programming, came the need to provide the viewer with a more convenient means for making program choices.

Paper guides listing channels and times of programming are printed in the newspaper and elsewhere but these are inconvenient and difficult to use, thus the development of electronic programming guides (EPGs). EPGs are lists of programming information displayed on the television screen or monitor which provide an interactive method for the viewer to review options and make programming choices.

In most EPGs known in the art, when a viewer wants to select a program, the EPG presents a list of available programs, typically in the form of a text list. The viewer is able to select the type of program, the time slots and other parameters in order to customize the program listings displayed and limit the choices to a reasonable number. In some cases, the text may have an additional small picture or logo pertaining to a specific item in the list of programs. For example, an image of a football may appear, referring to a listed football game or an image of a bat and ball may refer to a listed baseball game.

A drawback to the prior art EPGs is that knowing the name of the program, even with other information available in the textual format, may not be enough information to really inform the viewer of her choices. In this age of reruns and syndication, different episodes of the same show may be playing on the same day at different times or even on different channels at the same time. Just knowing the name of the show may not be enough to know if the program is an episode the viewer wishes to see. Also, with so many programming choices from which to draw, the viewer cannot possibly be acquainted with the name of every program. It would be useful to be able to see in real time what is currently showing on the selected channels and thus to receive quick impressions of the programs currently in progress when making a viewing choice.

One way of providing this kind of real time information is to create thumbnail video scenes for display on the video screen or monitor. "Thumbnail" is a term used by graphic designers meaning a small image representation of a larger image. Displaying thumbnail images of scene choices allows more choices to be displayed more quickly and manageably than using full size images.

The technology to generate a thumbnail of a video stream is known in the art. In standard broadcast television, for example, the approximate video resolution of the video stream is 600×400 pixels. In contrast, the thumbnail video resolution is much lower, typically only 20×16 pixels or so. In the prior art, broadcast providers generate live thumbnail video streams for multiple channels at the head-end and combine them into a fixed array of thumbnails which are made available to viewers in a single video stream broadcast over a separate preview channel. The fixed array of thumbnails is then capable of being displayed as a standard mosaic of live thumbnail videos.

One drawback to combining thumbnails into a fixed array at the provider head-end is that providers supply so many channels that only a small number of them can be combined into any particular array, typically up to 16 channels per array. But those 16 channels may not be the ones which the viewer is interested in previewing. Another drawback is that the use of a separate preview channel to supply the thumbnails wastes bandwidth. At the receiving end there is yet another drawback—the EPG cannot provide the viewer with the ability to select only certain thumbnails for display from the fixed array. Because the fixed array of thumbnails is encapsulated using standard video transport protocols, there is no way to identify the content of each individual thumbnail. Consequently, all of the thumbnails represented in the fixed array must be displayed on the preview channel as a predetermined mosaic of live thumbnail streams.

BRIEF DESCRIPTION OF DRAWINGS

The present invention will be described by way of exemplary embodiments, but not limitation, illustrated in the accompanying drawings in which like references denote similar elements, and in which.

DETAILED DESCRIPTION

In the following description, various aspects of the present invention, an image-oriented electronic programming guide (EPG) system, are described. Specific details are set forth in order to provide a thorough understanding of the present invention. However, it is understood by those skilled in the art that the present invention may be practiced with only some or all aspects described here, and with or without some or all of the specific details. In some instances, well-known features may be omitted or simplified in order not to obscure the present invention.

Parts of the description are presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

The present invention is described in components for ease in illustrating the embodiments. The invention may or may not actually be implemented in discrete components, and such components may or may not correspond to the components used in this description. Also, even though some components and functions may be described as being hardware or software, as is well understood by those in the art, which components and functions are implemented in hardware and which are implemented in software may vary depending on many factors, such as the speed of the processor or processors involved, among others, and these variations in implementation are well within the scope of the present invention. Also, the use of the term "hardware" is intended to include the term "logic" meaning Boolean logic as implemented in, for example, a Field Programmable Gate Array (FPGA) or Application Specific Integrated Circuit (ASIC).

Various operations are described as multiple discrete steps performed in turn in a manner that is most helpful in understanding the present invention. However, the order of description should not be construed to imply that these operations are necessarily performed in the order they are presented, or even order dependent. Lastly, repeated usage of the phrase "in one embodiment" does not necessarily refer to the same embodiment, although it may.

Figure 1:
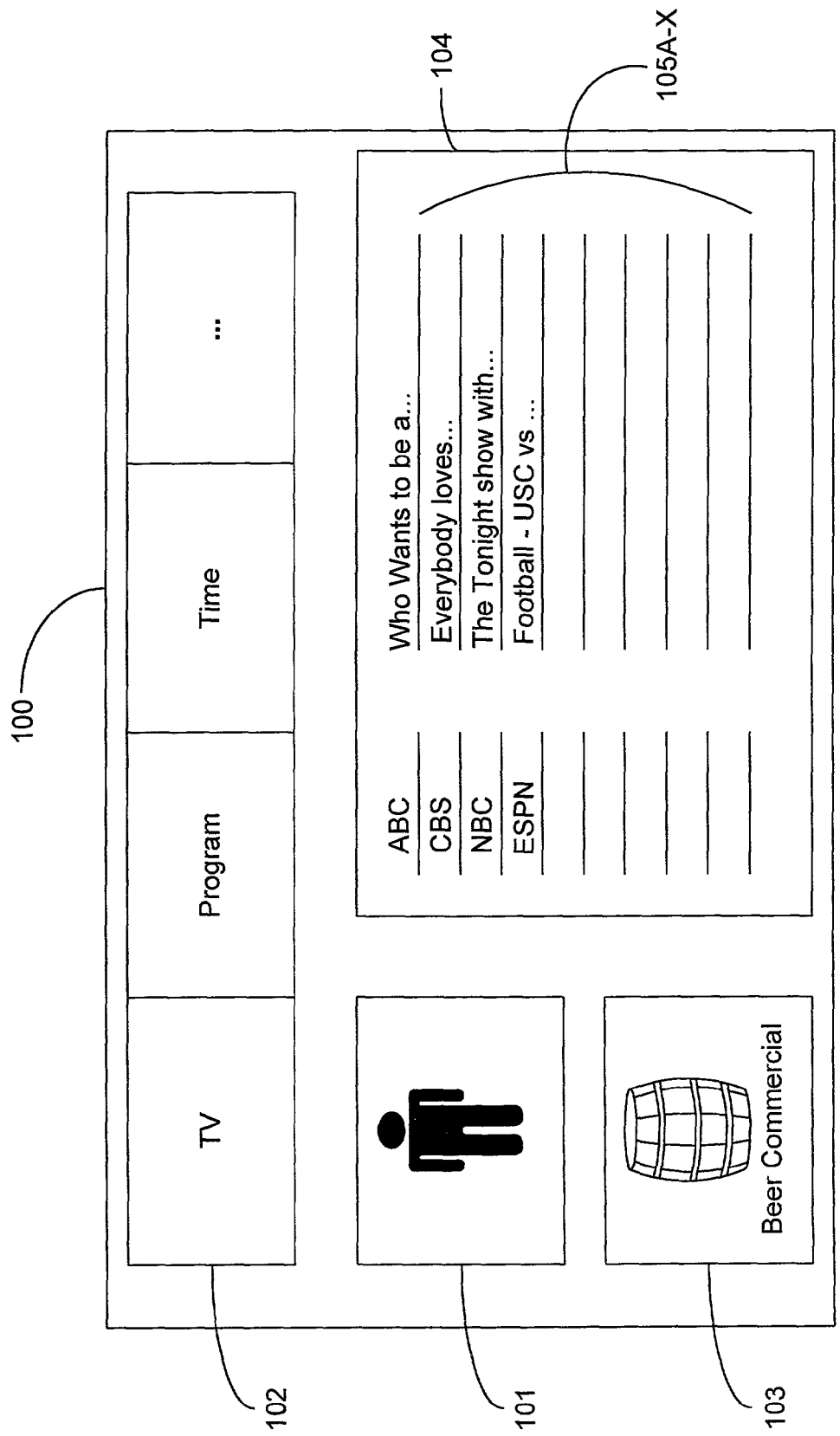
FIG. 1 is a block diagram illustrating a screen layout typical of the prior art.

FIG. 1 illustrates a typical display layout of a prior art EPG that typically operates in conjunction with a set-top box (STB). Screen 100 contains typical elements, such as a toolbar 102 that lets viewers select one type of system function from among various functions, such as television, games, interactive online banking or other services. Television is the selected function in FIG. 1. In this example, the toolbar 102 offers menu items to let the viewer select the type of programs, the time slots, and other parameters that determine the program listings displayed in the EPG. All of the parameters are combined in one of many ways known in the art resulting in a text list 105A-X displayed in a window 104 or a section of the screen 100 containing the text descriptions of the program listings. Some prior art EPGs include other windows to enhance the display of the text descriptions, such as window 101 displaying the currently tuned channel and an advertisement window 103 showing an advertising image.

Figure 2:
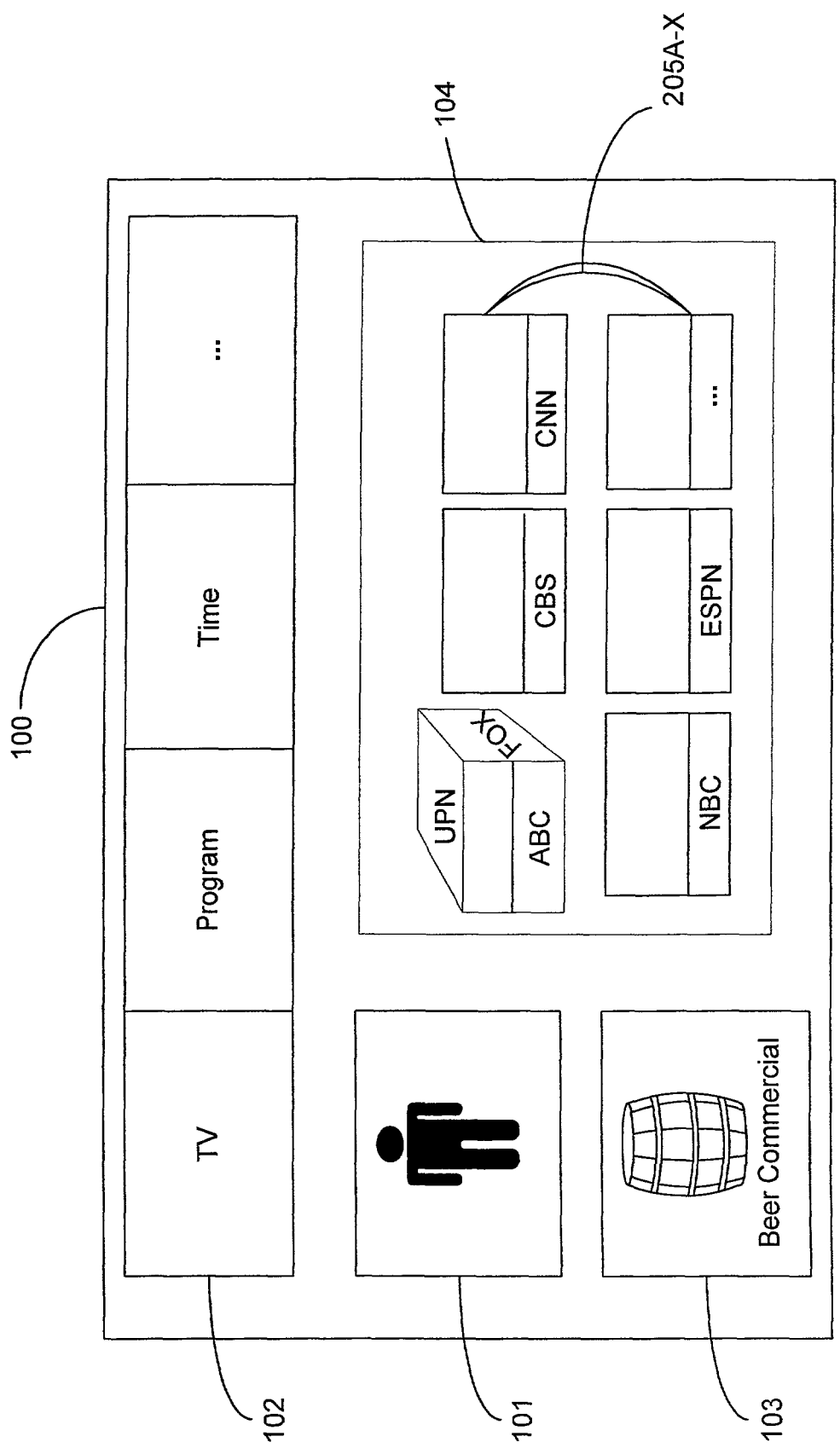
FIG. 2 is a block diagram illustrating a screen layout in accordance with one embodiment of the present invention.

FIG. 2 is a block diagram illustrating a screen layout in accordance with one embodiment of the present invention. In the illustrated embodiment, using an EPG, the viewer selects a list of programs or channels to be displayed as thumbnail video images. Instead of displaying the text descriptions of the programs in the text list 105A-X in window 104 and associated image enhancements in windows 101 and 103, the EPG displays real-time programming of the selected channels or programs in multiple thumbnail displays or individual image areas 205A-X. The content of the individual image areas 205A-X varies depending on the STB and associated components with which the invention is practiced. The associated components include, among other things, the television input circuitry, i.e. the tuner.

In one embodiment of the present invention, the individual image areas 205A-X contain snapshots of current programming for the selected channels. The snapshot is generated using an enhanced tuner or television input circuitry that is capable of capturing the snapshots from a television input source. Each snapshot is updated at brief intervals of, for example, a few seconds, or whenever a scene change is detected.

In yet another embodiment of the present invention, the individual image areas 205A-X contain thumbnail video streams of real-time programming for the selected channels. The thumbnail video streams are provided on an enhanced preview channel generated by a head-end server. The head-end server reduces the resolution of each video stream, encapsulates each reduced stream with an identifying header, encodes the encapsulated video streams and multiplexes them into the enhanced preview channel.

Figure 3A:
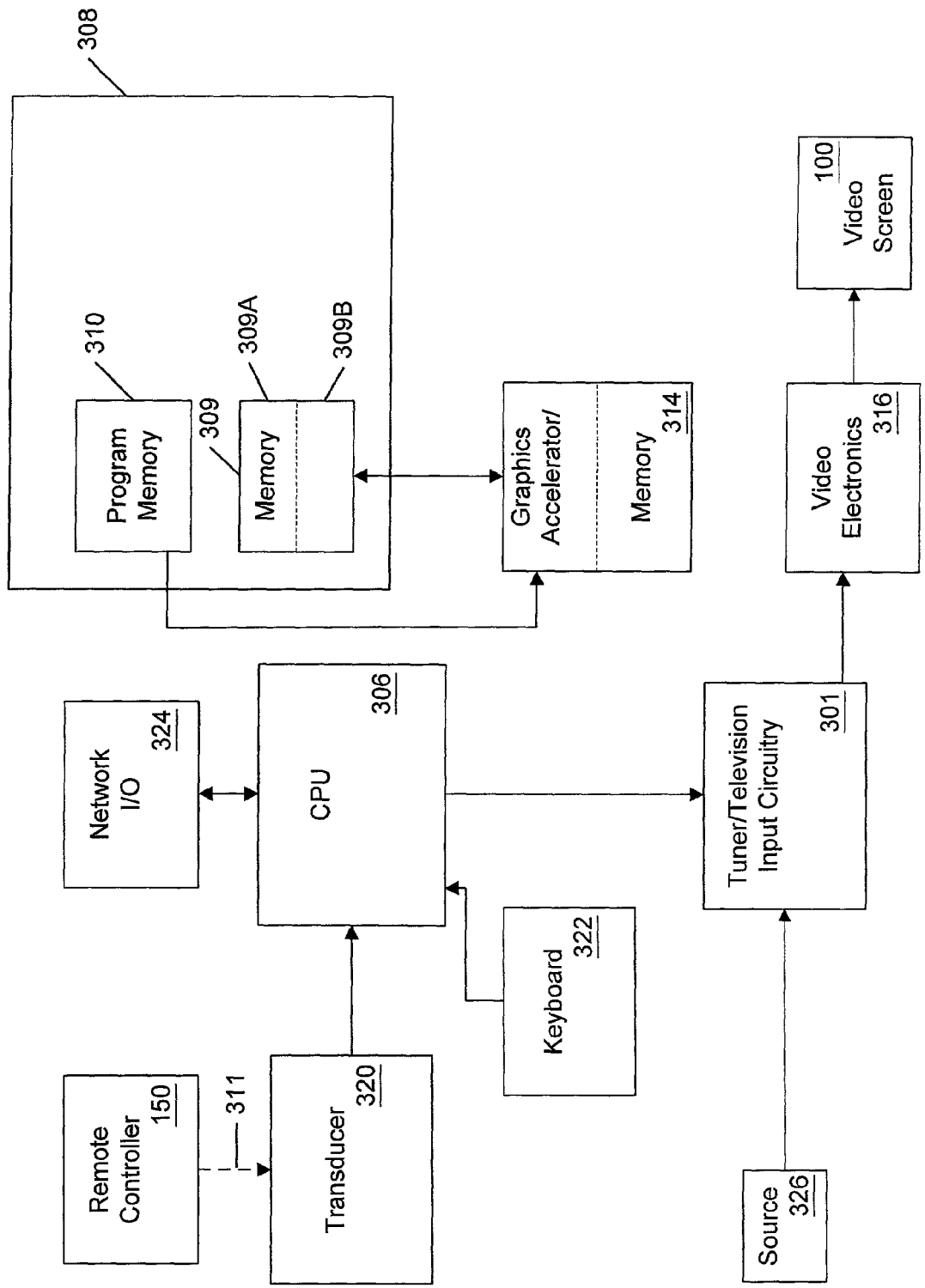
FIG. 3A is a block diagram illustrating a set-top box (STB) and associated components in which certain aspects of an image-oriented EPG system may be practiced in accordance with one embodiment of the present invention.

FIG. 3A is a block diagram illustrating a set-top box (STB) and associated components in which certain aspects of an image-oriented EPG system may be practiced in accordance with one embodiment of the present invention. The STB and associated components typically comprise a CPU 306 (e.g. a Celeron or Pentium, manufactured by Intel Corporation, or any other equivalent CPU) coupled to a memory 308 comprising a program memory 310 (typically a ROM, EPROM, EEPROM, EAROM, hard disk, CD ROM, or other memory device) and a second memory device 309 (e.g. a RAM or magnetic disk); and a graphics accelerator circuit and associated memory 314. Program memory 310 contains the program instructions executed by CPU 306. Memory 308 can comprise one or more memory devices. In one embodiment, memory 308 contains a portion 309A containing information concerning the polygons used to construct images of objects and a portion 309B containing pixel information to be applied, or bound, to the polygons. Graphics accelerator 314 accesses the information contained in memory 308 and constructs an image in a pixel array memory 309. Information from pixel array memory 309 is provided to video electronics circuit 316 for display on video display screen 100.

Also shown in FIG. 3A is remote control device 150, which is manipulated by a viewer as described above. Remote control device 150 provides signals (typically communicated via infra red communication (or any other method as previously described) shown as dotted line arrow 311 to a transducer 320 that is coupled to CPU 306. CPU 306 reads the signals provided by remote control device 150, and controls the images displayed on video screen 100 in response thereto. Also, many small differences can be made in the "architecture" of connecting the remote control base unit (e.g. the transceiver that receives signals from remote controller 150). In some cases this architecture may mimic a parallel or serial port, and in other cases it may mimic a mouse and or a keyboard. This is advantageous, since it allows remote controller 150 to send commands directly to image oriented EPG system 200, without requiring special driver software.

Also shown in FIG. 3A is a network I/O circuit 324. Network I/O circuit 324 can be any of numerous different types of circuits, e.g. a modem for communicating with the internet, or an interface circuit for communicating with other LAN or WAN networks. As mentioned above, by clicking on an icon or pictogram 103, a viewer can obtain data concerning items that can be purchased from different vendors. In one embodiment, when a viewer clicks on one of these icons, a signal is communicated to a server coupled to the LAN or WAN network, and that server communicates via network circuit 324 back to CPU 306 information to be displayed on screen 100 concerning merchandise that can be ordered from that vendor. This information can be in the form of a web page, for example. Network circuit 324 can also be used to order pay-per-view items via a LAN or WAN.

Also shown in FIG. 3A is a tuner/television input circuit 301. Tuner 301 receives a video signal from a source 326, e.g. a television antenna, an electrical or optical cable system, a satellite system, or any other appropriate video signal source. The video signal carries the video information representing the channel or enhanced preview channel that is communicated to video electronics 316 for display on screen 100.

In one embodiment, the EPG can receive information and commands by a keyboard 322 that is electrically coupled to CPU 306. Keyboard 322 can be an alphanumeric keyboard, e.g. a qwerty keyboard. However, other types of keyboards can be used in conjunction with the EPG. Keyboard 322 provides additional flexibility for a viewer controlling the EPG.

In one embodiment, the EPG can be programmed to provide to the viewer a reminder when certain programs of interest are going to be on. This can be accomplished using remote controller 150, clicking on a selected program pictogram, and pressing a control button on the remote controller that instructs CPU 306 to display a prompt on screen 100 shortly before that program is to be broadcast. Alternatively, remote controller 150 can have a numeric keyboard or a more complicated input control console for purposes of entering such information into the EPG. Alternatively, keyboard 322 can be used to enter this information.

In one embodiment, a viewer can modify the format in which the EPG information is to be displayed. For example, the viewer can adjust the size of the text (e.g. the font size) of the information displayed by the EPG. Thus, viewers with poor vision will be better able to read the information displayed by the EPG. Viewers with good vision can shrink the text size so that more information can be displayed on the screen by the EPG. This can be accomplished by using remote controller 150 to cause CPU 306 to display an appropriate menu of control options on screen 100. The viewer can then click on the displayed options to enter a text font size into the EPG. (The text font size is typically stored within a memory in the EPG, e.g. within memory 309.) Rather than clicking on text font size options, text font size information can be entered into the EPG using keyboard 322.

There are several ways that a viewer can enter mode information into the EPG. For example, remote controller 150 can have a mode button. When the mode button is pressed, a list of programmable menu options appears on screen 100, and the viewer can click on a desired option. Alternatively, the EPG can have a menu icon, and the viewer can click on the menu icon. Alternatively, there can be a menu button on STB itself that a viewer can push. Other techniques can be used to communicate programmable option choices to the EPG.

In another embodiment, such as that discussed in reference to an image-oriented EPG system capable of displaying the individual image areas 205A-X of FIG. 2, portions of the EPG can be used to display reduced size versions (for example, the snapshots or thumbnail video streams) of real-time programming appearing on various channels, thereby permitting a viewer to preview programs. For example, optionally, the individual image areas 205A-X of window 104 of screen 100 in FIG. 2 may depict a thumbnail display of what is playing on one of the channels. In another embodiment, the individual image areas 205A-X of window 104 of screen 100 may depict a set of reduced size displays (e.g. the thumbnails or snapshots displayed in individual image areas 205A-X) so that a viewer can see what is showing on different channels simultaneously.

In an alternative embodiment, the reduced size displays in individual image areas 205A-X can be mapped onto one or more independent or geometric surfaces, e.g. the surfaces of a polyhedron (e.g. a cube) as described in U.S. patent application Ser. No. 09/378,184, filed Aug. 20, 1999 by Kamen et al., and U.S. patent application Ser. No. 09/378,220, filed Aug. 20, 1999 by Kamen et al. The '184 and '220 Applications are incorporated herein by reference. The graphics circuitry that provides the information displayed on screen 100 stores the image elements of the individual image areas 205A-X in a 3D model and generates the image of the individual image areas 205A-X using a 3D accelerator. This is done in a manner similar to that described in U.S. patent application Ser. Nos. 09/344,442 and 09/361,470. (The '442 and '470 Applications describe 3D accelerator technology and are incorporated herein by reference.) Briefly, this is accomplished by a) storing a computer model of an independent or geometric surface of one or more of the individual image areas 205A-X in a first set of memory locations within the television STB; b) storing within a second set of memory locations a two dimensional image to be mapped onto that surface (e.g. a pixel array); and c) constructing a pixel array comprising the individual image area 205A-X.

The '184 and '220 Applications teach mapping (or binding) video images of the reduced size displays onto an independent surface or a geometric surface of the individual image areas 205A-X using 3D accelerator technology. A 3D graphics accelerator generates a pixel array corresponding to these images as bound onto the independent or geometric surfaces. By altering the position of a "virtual viewer", or by altering the shape or angle of the independent or geometric surface, one can create an appearance similar to projecting a movie onto a surface having a particular shape, or held at a particular angle. The '184 and '220 applications teach, among other things, that one can display an individual image area 205A-X as a polyhedron (e.g. a cube), with different video images of the reduced size displays appearing on the various faces of the cube. A viewer can alter the orientation of the polyhedron using the remote controller so that different polyhedron faces are exposed.

For example, in one embodiment of the invention, programs from different channels are mapped onto different faces of a polyhedron (e.g. the three faces of the ABC/UPN/FOX polyhedron in the individual image areas 205A-X of FIG. 2). A viewer can rotate the ABC/UPN/FOX polyhedron to obtain a thumbnail display of what is playing on the various channels. (For such an embodiment, it is typically desirable to include a video capture card within STB for downloading the video signals into a pixel memory so that graphics accelerator 314 can map these pixels onto the various geometric surfaces of the ABC/UPN/FOX polyhedron.)

The location and angle of the independent or geometric surface upon which the reduced size video images are mapped can be modified by the EPG. For example, by clicking on a reduced size video image in individual image areas 205A-X, the viewer can cause the EPG to move the image closer to the virtual viewer (i.e. enlarge the portion of the screen showing the video image.)

Figure 3B:
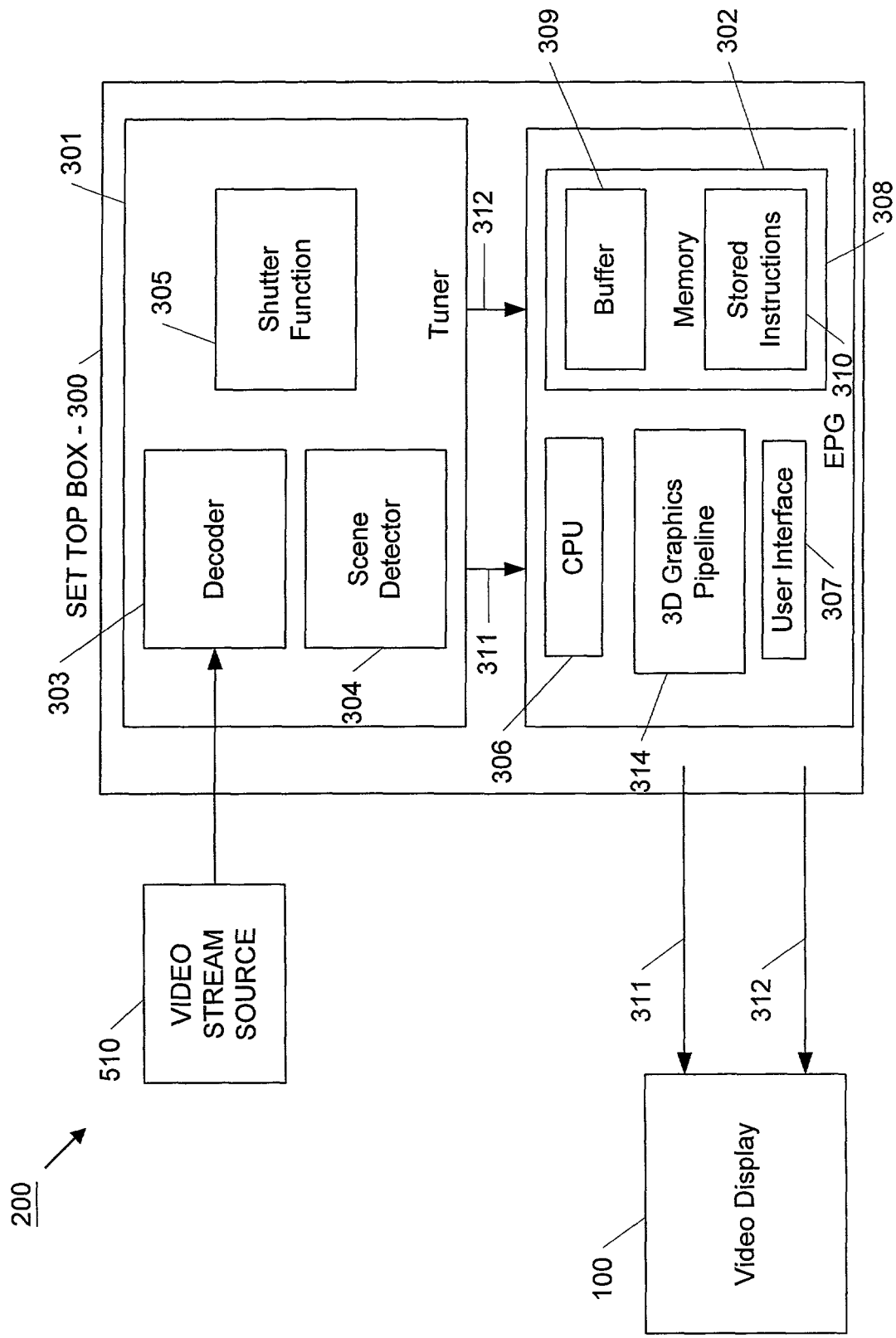
FIG. 3B is a block diagram further illustrating the STB and associated components in which certain aspects of an image-oriented EPG system may be practiced in accordance with one embodiment of the present invention.

FIG. 3B is a block diagram further illustrating the STB and associated components in which certain aspects of an image-oriented EPG system may be practiced in accordance with one embodiment of the present invention. In the embodiment, the image-oriented EPG system 200 comprises a STB 300, which includes an enhanced tuner 301 with a decoder 303, scene detector 304, and shutter function 305. The STB 300 also includes the EPG component 302. In other embodiments, the STB 300 might include multiple tuners with or without scene detection capabilities.

As illustrated in FIG. 3B, the programming guide functions of the present invention may be implemented on a computer system executing the EPG component 302. The EPG component 302 includes a central processing unit or multi-processor system (CPU) 306, user interface 307, and memory 308, all of which are connected by one or more buses. In one embodiment the memory 308, which can include one or more of cache memories, system memory (RAM), and nonvolatile storage devices (e.g., magnetic or optical disks), is coupled to the bus for storage of instructions 310 and to buffer data 309 for use by CPU 306.

In one embodiment, the EPG component 302 further includes a 3D graphics pipeline 313 that may comprise a software component or a graphics accellerator 314, or both. The 3D graphics pipeline 313 operates in conjunction with the instructions 310 and data buffered in memory 309, 309A and 309B to generate and bind a reduced video image (e.g. a snapshot or thumbnail video stream) to an independent or geometric surface of an individual image area 205A-X. User interface 307 may include interfaces to multiple input/output devices including remote controls, television sets, and other types of monitors and displays 100. It is to be appreciated that various components of the image-oriented EPG system 200 may be rearranged, and that certain implementations of the present invention may not require nor include all of the above components. Furthermore, additional components may be included in image-oriented EPG system 200, such as additional processors, storage devices, memories, network/communication interfaces, multiple buses, etc.

Figure 4A:
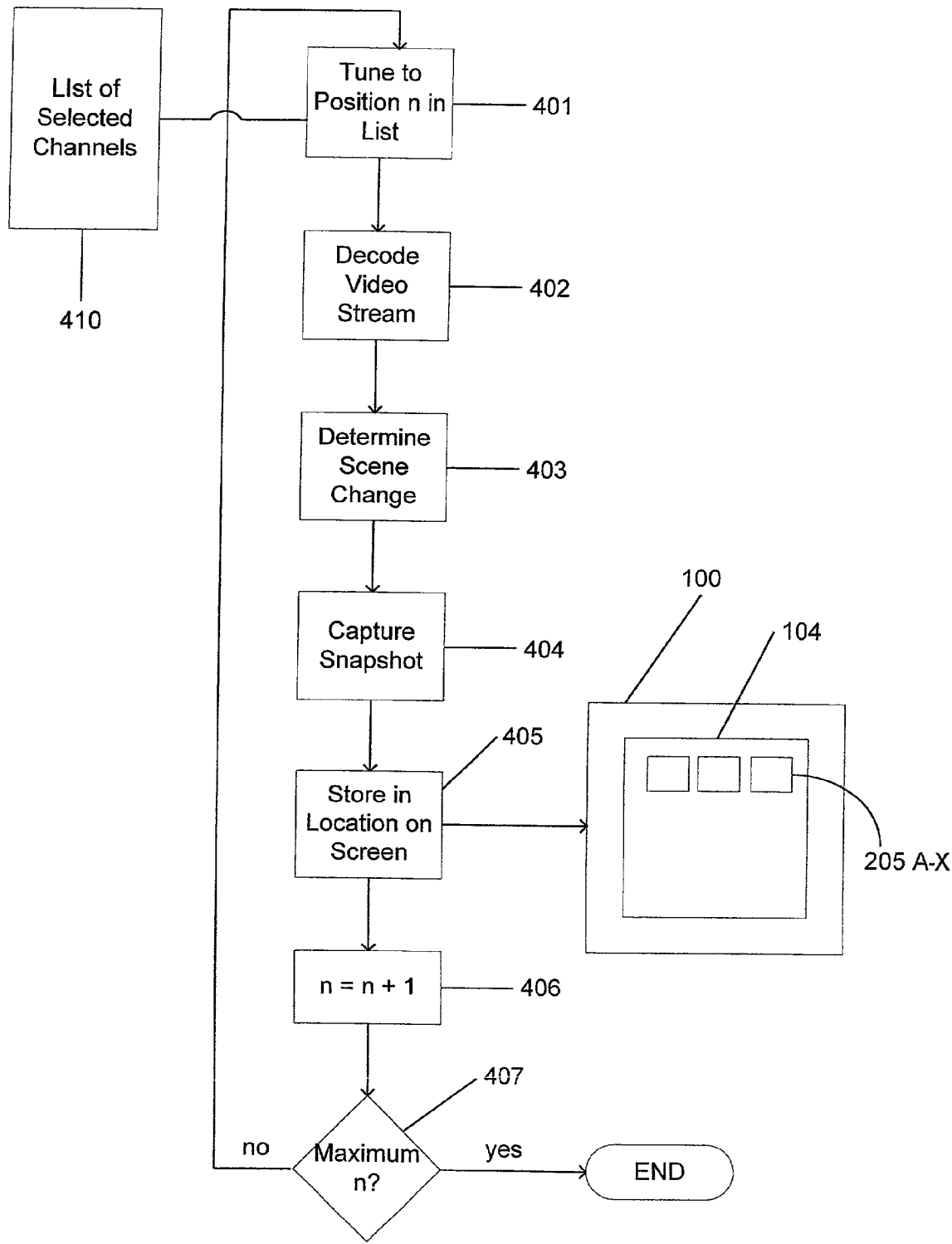
FIG. 4A is a flow diagram illustrating certain aspects of a method to be performed by the STB and associated components of FIGS. 3A-B when executing one embodiment of the illustrated invention.
Figure 4B:
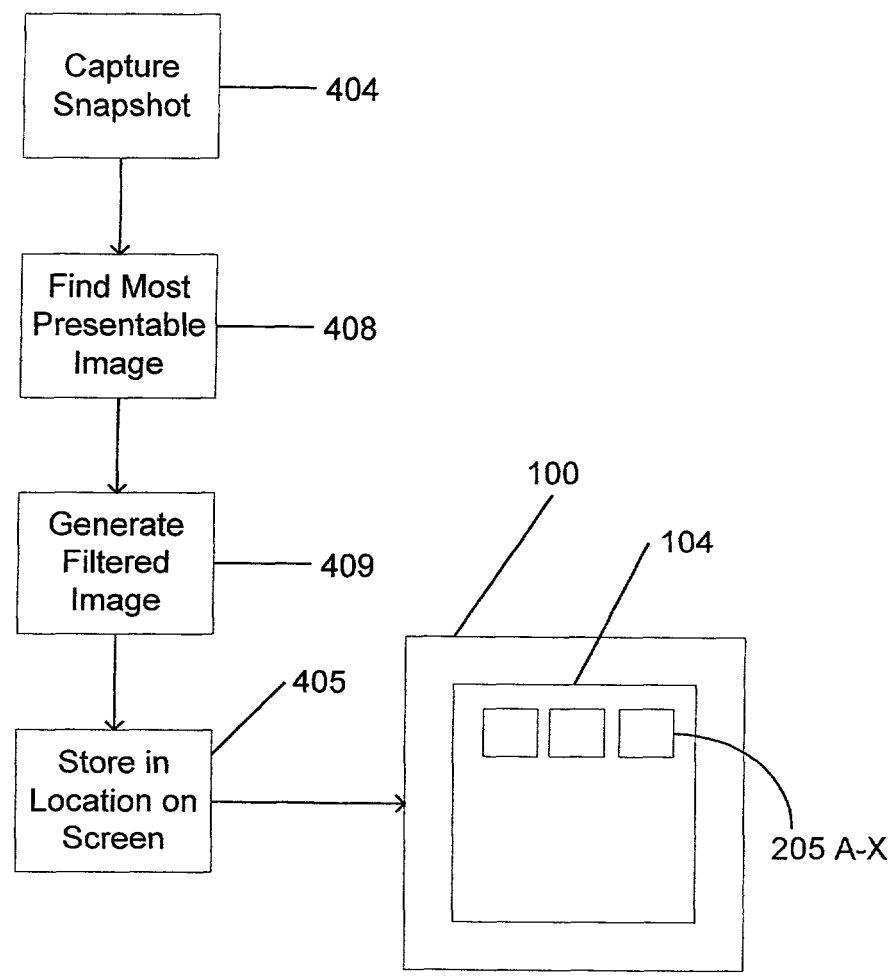
FIG. 4B is flow diagram illustrating certain other aspects of a method to be performed by the STB and associated components of FIGS. 3A-B when executing one embodiment of the illustrated invention.

FIG. 4A and FIG. 4B are flow diagrams illustrating certain aspects of a method to be performed by the STB and associated components of FIGS. 3A-B when executing one embodiment of the illustrated invention. The methods to be performed by a computer constitute computer programs made up of computer-executable instructions. Describing the methods by reference to a flowchart enables one skilled in the art to develop such programs including such instructions to carry out the methods on suitably configured computers (the processor or processors of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems or without an operating system.

The present invention is not described with reference to any particular programming language. It is appreciated that a variety of programming languages may be used to implement the teachings of the invention as described herein. Furthermore, it is common in the art to speak of software, in one form or another (e.g., program, procedure, process, application), as taking an action or causing a result. Such expressions are merely a shorthand way of saying that execution of the software by a computer causes the processor or processors of the computer to perform an action or to produce a result.

FIG. 4A is a flow diagram for a single-tuner embodiment of the present invention, in which the image-oriented EPG system 200 displays real-time snapshots of selected channels in the individual image areas 205A-X. At processing block 401, the tuner 301, enhanced with scene detection capabilities 304, sequentially tunes through the list of channels 410 selected by the viewer. The tuner 301 tunes to the channel represented in position "n" in the list of channels 410 selected by the viewer. The decoder 303 decodes the video stream 510 (described in FIG. 5) received over the channel using an analog or digital decoding scheme that is well known in the art, until at processing block 402 a steady stream is available. At processing block 403, the scene detector 304 detects a scene change and triggers a shutter function 305. At processing block 404, the shutter function captures a snapshot 311 of the new scene. The snapshot 311 is stored in one of the individual image areas 205A-X assigned to position "n" in the list of channels 410, and displayed on video display 100. At processing block 406, the position "n" in the list of channels 410 is incremented. At decision block 407, the entire process 401-406 repeats for the next channel until the list of channels 410 is exhausted.

FIG. 4B is a flow diagram illustrating certain additional aspects of the image-oriented EPG system 200 illustrated in FIG. 4A. In the illustrated embodiment, the image-oriented EPG system 200 further generates an improved image for display in the individual image areas 205A-X. At processing block 408, after the shutter function 305 captures multiple snapshots 311 and stores them in buffer 309 (from processing block 404 of FIG. 4A), the image-oriented EPG system 200 selects from them the most presentable image. The criteria for determining which of the snapshots 311 is the most presentable image may include which snapshot 311 has the best contrast, median brightness, most color, etc. At processing block 409, the image-oriented EPG system 200 generates a new filtered image based on the most presentable image to represent the program on the selected channel in the best manner. The filtered image is generated using filters including a black and white format, an enhanced or reduced contrast, an enhanced or reduced color saturation, etc., before being stored, at processing block 405, in one of the individual image areas 205A-X in window 104 of display 100, as assigned to position "n" in the list of channels 410.

In one embodiment of the present invention, the image-oriented EPG system 200 displays reduced resolution real-time video streams (i.e. thumbnail video streams) of the selected channels in the individual image areas 205A-X. The thumbnail video streams are selected from hundreds of thumbnail video streams that are streamed over an enhanced preview channel. The thumbnail video streams have extremely high compression because their resolution is very low. For example, a thumbnail video stream may comprise only 24 by 48 pixels for each image.

In one embodiment, the enhanced preview channel is generated at the cable or broadcast head-end, where a head-end component reduces the resolution of the video stream and encapsulates it with an identifying header. The encapsulated streams are chunked together, for example in groups of 100, and transmitted to a viewer's STB 300 for decoding. The identifying header provides the information necessary for making a program or channel selection via the image-oriented EPG system 200, thereby allowing the viewer to select which programs or channels are viewed from the enhanced preview channel rather than being restricted to viewing only a predefined mosaic of thumbnail previews such as those available from prior art preview channels.

Figure 5:
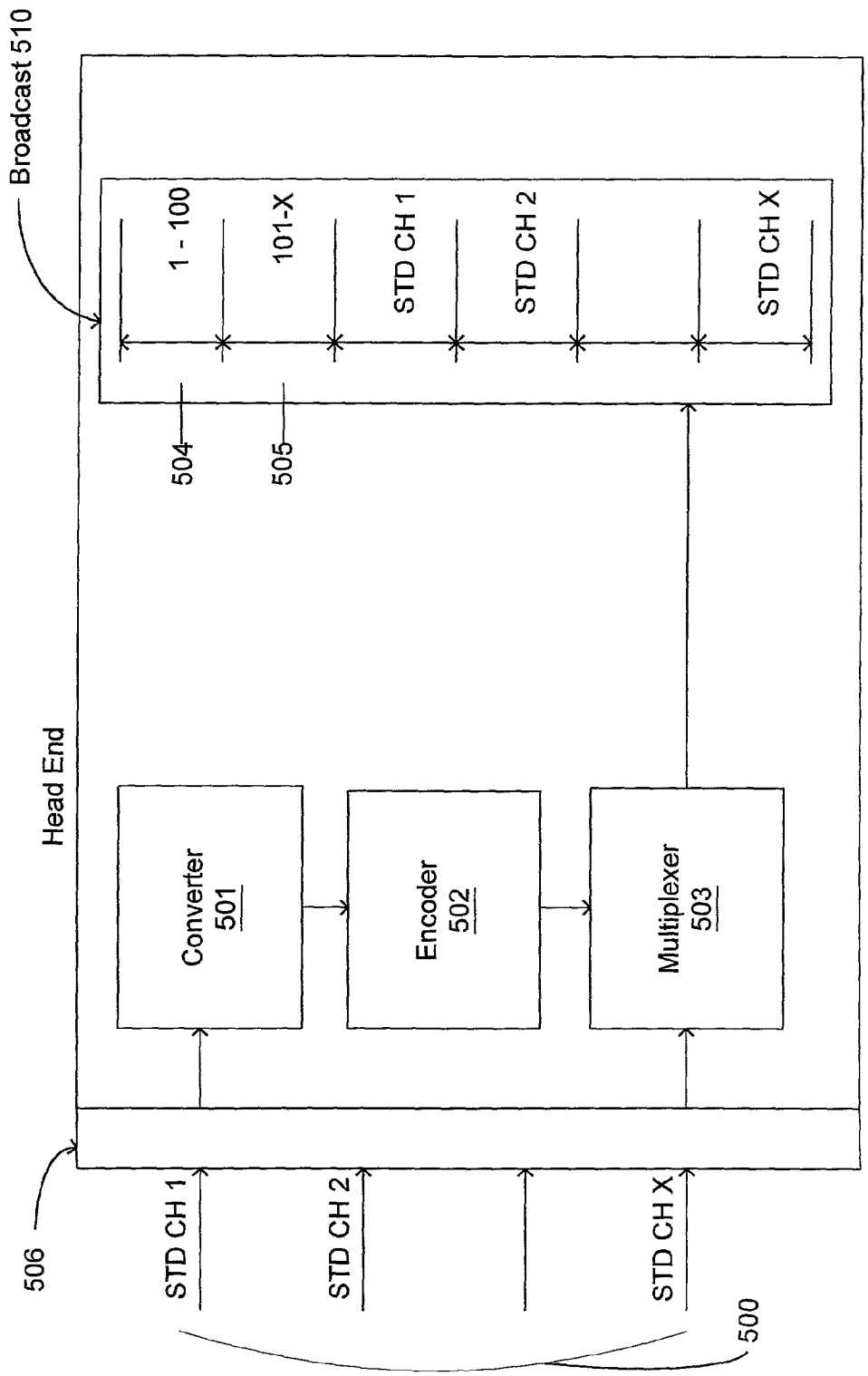
FIG. 5 is a block diagram illustrating a head-end and associated components in which certain aspects of an image-oriented EPG system may be practiced in accordance with one embodiment of the present invention.

FIG. 5 is a block diagram illustrating certain aspects of a head-end component 506 of the image-oriented EPG system 200 according to one embodiment of the present invention. FIG. 5 illustrates how a set of standard channels STD CH 1-X 500 might be converted to thumbnail video streams. A size conversion function 501 receives the video stream of each standard channel STD CH 1-X 500, say from a satellite link or other video source. The video stream may be, for example, an analog video stream or a digitally encoded video stream, such as an MPEG (Moving Picture Experts Group) file. In standard broadcast television the approximate video resolution of the video stream in the standard channels STD CH 1-X 500 is 600×400 pixels. The converter 501 reduces the resolution to 20×16 pixels or a similar small, suitable size. The encoder 502 encodes the reduced video stream and the multiplexer 503 combines the reduced, encoded video streams into an enhanced preview channel 504-505. In the illustrated example, each of the enhanced preview channels 504-505 contains up to 100 channels of live reduced video streams (i.e. the thumbnail video streams), however other number of channels may be combined together without departing from the scope of the invention. The enhanced preview channels 504-505 may be further combined with the full-resolution standard channels STD CH 1-X 500 into a comprehensive broadcast output 510. Components 501, 502 and 503 of the head-end component 506 may be implemented in software or hardware, or a combination thereof, without departing from the scope of the invention.

In one embodiment, on the receiving side of the image-oriented EPG system 200, the decoder 303 of STB 300 decodes selected thumbnail streams using the identifying headers and in accordance with the list of selected channels set up by the viewer. The list of channels may be set up using dedicated hardware or software well known in the art running an EPG 302 on a CPU 306 in STB 300.

In one embodiment, the image-oriented EPG system 200 of the present invention may be implemented in discrete hardware or firmware, or in one or more ASICs of an additional circuit board for insertion into an STB 300 or other television-enhanced computer system. In yet another embodiment, an embodiment of the image-oriented EPG system 200 the present invention is implemented entirely in software routines executed by a high-speed processor or processors 306 in a system such as EPG component 302. These software routines comprise a series of instructions to be executed by a processing system in a hardware system. It is to be appreciated that the series of instructions can be stored using any conventional computer-readable or machine-accessible storage medium, such as a diskette, DC-ROM, magnetic tape, DVD, ROM, Flash memory, etc. It is also to be appreciated that the series of instructions need not be stored locally, and could be stored on a remote storage device, such as a server on a network, via a network/communication interface. It is to be appreciated that these software routines may be implemented in any of a wide variety of programming languages.

In one embodiment, the image-oriented EPG system 200 provides a reliable and efficient method of updating or replacing the application software that implements the EPG 302 at the viewer sites. This can be accomplished by downloading such software either from the cable broadcaster (e.g. from source 326 using tuner/television input circuitry 301), or via a WAN or LAN, e.g. using network I/O circuit 324 (FIG. 3A). The EPG software of the image-oriented EPG system 200 can be designed in modules. For example, one module is optionally a graphics user interface (GUI), e.g. module 307, whereas another module can handle the different display icons. Another module can handle 3D graphics generation, e.g. module 314, and another module can be a master program module. These modules can be downloaded into program memory 310. EPG updates can be provided either automatically or in response to a prompt from the viewer using remote controller 150.

In an embodiment which permits the automated updating of software, the program memory 310 should contain a programmable segment (e.g. a RAM, EEPROM, EAROM, magnetic memory or magneto-optic memory) to accommodate the loading of data.

In one embodiment, the EPG operates as a shell or window to enable a viewer to access other applications or information systems that are not part of the EPG application or data. For example, in one embodiment, when using the EPG, one can press a button on the remote controller, or click on an icon within the EPG to active Internet server software (e.g. Netscape software Internet Explorer software, or other web surfing software package). (Such software can be stored within program memory 310.) In this embodiment, the information provided by the web and the web surfing software package is bound to a flat independent or geometric surface and displayed on screen 100. The viewer can then use the screen to browse the Internet as if he or she were logged onto a personal computer (PC). In such an embodiment, it is typically desirable to couple alphanumeric keyboard 322 or other alphanumeric input device to STB 200 so that the viewer can enter key words for searching or type URLs into STB 200. In this embodiment, STB 200 communicates with a proxy server or other ISP via network I/O circuit 324 (FIG. 3A).

The options and features described above can be combined to provide a 3D enhanced image-oriented EPG system 300 that allows user friendliness and interactivity not known in current EPG systems. However, these options and features can be practiced independently. Further, different combinations of these options and features can be practiced in an image-oriented EPG system 300.

While the invention has been described with respect to specific embodiments, those skilled in the art will appreciate that changes can be made in form and detail without departing from the spirit and scope of the invention. For example, an image-oriented EPG system 300 in accordance with an embodiment the present invention can be displayed on CRT, LCD, projection, or other types of display systems. The image-oriented EPG system 300 can be further displayed on a television (TV), personal computer (PC), or a device that is a combination TV/PC. The image-oriented EPG system 300 can be used in conjunction with video signals that are provided by electrical or optical cable, radio wave broadcast, satellite broadcast, or other types of video signal transmission. The information displayed in the image-oriented EPG system 300 can originate from any of numerous sources, e.g. provided via electrical or optical cable, radio waves, satellite broadcast, or a wide area network (for example, the Internet).

When displaying video information, the video information may be applied to an independent or geometric surface using a 3D graphics pipeline. Thus, as shown in FIG. 2, both individual image areas 205A-X in window 104 of screen 100 as well as the television program displayed in window 101 can be bound to independent or geometric surfaces and displayed using a 3D graphics pipeline. (In fact, in one embodiment, when watching the television program when not displaying the user interface 307 of image-oriented EPG system 200, the display of the television program itself can be bound to an independent or geometric surface and displayed as described above.)

As explained in the above-incorporated '442 application, the 3D graphics pipeline can be implemented by a combination of hardware elements, known as accelerators, and software, some of which is referred to as drivers. The partitioning between hardware and software may vary. Accordingly, all of these modifications come within the present invention. Thus, the present invention is not limited by the details described. Instead, the present invention can be practiced with modifications and alterations within the spirit and scope of the appended claims.

We claim:

1. A method comprising:
    providing a plurality of individual image areas in an electronic programming guide (EPG) display;
    receiving a plurality of reduced resolution video streams corresponding to video programming channels, wherein each of said plurality of reduced resolution video streams is encapsulated with an identifying header;
    receiving a user selection via the EPG of a first video programming channel to be displayed in a graphical representation of a polyhedron in the EPG display;
    in response to the user selection of the first video programming channel, decoding a first reduced resolution video stream corresponding to the first selected video programming channel using a first identifying header encapsulated with the first reduced resolution video stream;
    displaying a graphical representation of a polyhedron in a first of the individual image areas;
    binding the first reduced resolution video stream to a surface of the graphical representation of the polyhedron; and
    displaying the first reduced resolution video stream on the surface of the graphical representation of the polyhedron in the first of the individual image areas in the EPG display.

2. The method of claim 1, further comprising detecting a scene change in the first reduced resolution video stream.

3. The method of claim 1, wherein displaying the graphical representation of the polyhedron comprises rendering a plurality of reduced resolution thumbnail video streams on different sides of the polyhedron, wherein each of the plurality of reduced resolution thumbnail video streams corresponds to a different channel, and wherein the different sides of the polyhedron are rendered on different portions of the electronic programming guide (EPG) display, the different portions being simultaneously visible and having different sizes and shapes in the electronic programming guide (EPG) display.

4. The method of claim 1, wherein each side of the polyhedron corresponds to a different video channel having a different reduced resolution video stream, the method further comprising:
    receiving a user command to rotate the graphical representation of the polyhedron; and
    updating the EPG display by rotating the graphical representation of the polyhedron so that one of the different selected channels is displayed in the first of the individual image areas.

5. The method of claim 4, wherein each of the different video channels corresponding to the different sides of the polyhedron is a video channel selected by a user for displaying on the polyhedron, and wherein the video channels selected for displaying on the polyhedron are a subset of a larger number of video channels available to the user via the electronic programming guide.

6. The method of claim 1, further comprising:
    receiving a user command to perform at least one of moving the graphical representation of the polyhedron and resizing the graphical representation of the polyhedron; and
    updating the EPG display in response to the user command, the updating comprising at least one of:
        moving the graphical representation of the polyhedron to a different one of the individual image areas in the display of the electronic programming guide, and
        changing the size of the graphical representation of the polyhedron within the display of the electronic programming guide.

7. The method of claim 1, wherein the binding comprises using a graphics accelerator to map the pixels of the first reduced resolution video stream onto the surface of the graphical representation of the polyhedron.

8. The method of claim 1, wherein binding the first reduced resolution video stream to the surface of the graphical representation of the polyhedron comprises using a 3D graphics pipeline.

9. The method of claim 1, wherein receiving the plurality of reduced resolution video streams comprises receiving an enhanced preview channel from a head-end server.

10. An apparatus comprising:
    a tuner configured to tune to a selected channel and to receive a video stream; and
    an electronic programming guide component configured to:
        display an electronic programming guide (EPG) comprising a plurality of individual image areas;
        receive a plurality of reduced resolution video streams corresponding to video programming channels, wherein each of said plurality of reduced resolution video streams is encapsulated with an identifying header;
        receive a user selection via the EPG of a first video programming channel to be displayed in a graphical representation of a polyhedron in the EPG display;
        in response to the user selection of the first video programming channel, decode a first reduced resolution video stream corresponding to the first selected video programming channel using a first identifying header encapsulated with the first reduced resolution video stream;
        display a graphical representation of a polyhedron in a first of the individual image areas;
        bind the first reduced resolution video stream to a surface of the graphical representation of the polyhedron; and display the first resolution video stream on the surface of the graphical representation of the polyhedron in the first individual image area in the displayed EPG.

11. The apparatus of claim 10, further comprising a scene change detector configured to detect a scene change in the first reduced resolution video stream.

12. The apparatus of claim 10, wherein displaying the graphical representation of the polyhedron comprises rendering a plurality of reduced resolution thumbnail video streams on different sides of the polyhedron, wherein each of the plurality of reduced resolution thumbnail video streams corresponds to a different channel, and wherein the different sides of the polyhedron are rendered on different portions of the electronic programming guide (EPG), the different portions being simultaneously visible and having different sizes and shapes in the electronic programming guide (EPG).

13. The apparatus of claim 10, wherein each side of the polyhedron corresponds to a different video channel having a different reduced resolution video stream, wherein the apparatus further comprises a receiver configured to receive a user command to rotate the graphical representation of the polyhedron, and wherein the display is further configured to update the display by rotating the graphical representation of the polyhedron so that one of the different selected channels is displayed in the first individual image area.

14. The apparatus of claim 13, wherein each of the different video channels corresponding to the different sides of the polyhedron is a video channel selected by a user for displaying on the polyhedron, and wherein the video channels selected for displaying on the polyhedron are a subset of a larger number of video channels available to the user via the electronic programming guide.

15. The apparatus of claim 10, the apparatus further comprising:
   a receiver configured to receive a user command to perform at least one of moving the graphical representation of the polyhedron and resizing the graphical representation of the polyhedron,
   wherein the electronic programming guide (EPG) component is further configured to update the EPG display in response to the user command, the updating comprising at least one of:
      moving the graphical representation of the polyhedron to a different one of the individual image areas in the display of the electronic programming guide, and
      changing the size of the graphical representation of the polyhedron within the display of the electronic programming guide.

16. The apparatus of claim 10, wherein the binding comprises using a graphics accelerator to map the pixels of the first reduced resolution video stream onto the surface of the graphical representation of the polyhedron.

17. The apparatus of claim 10, further comprising a 3D graphics pipeline, wherein the 3D graphics pipeline is configured to perform the binding of the first reduced resolution video stream to the surface of the graphical representation of the polyhedron.

18. The apparatus of claim 10, wherein receiving the plurality of reduced resolution video streams comprises receiving an enhanced preview channel from a head-end server.

19. At least one non-transitory computer-readable media storing computer-executable instructions, that when executed on a computer, cause the computer to perform a method comprising:
   providing a plurality of individual image areas in an electronic programming guide (EPG) display;
   receiving a plurality of reduced resolution video streams corresponding to video programming channels, wherein each of said plurality of reduced resolution video streams is encapsulated with an identifying header;
   receiving a user selection via the EPG of a first video programming channel to be displayed in a graphical representation of a polyhedron in the EPG display;
   in response to the user selection of the first video programming channel, decoding a first reduced resolution video stream corresponding to the first selected video programming channel using a first identifying header encapsulated with the first reduced resolution video stream;
   displaying a graphical representation of a polyhedron in a first of the individual image areas;
   binding the first reduced resolution video stream to a surface of the graphical representation of the polyhedron; and
   displaying the first reduced resolution video stream on the surface of the graphical representation of the polyhedron in the first of the individual image areas in the EPG display.

20. The at least one non-transitory computer-readable media of claim 19, the method further comprising:
   receiving a user command to perform at least one of moving the graphical representation of the polyhedron and resizing the graphical representation of the polyhedron; and
   updating the EPG display in response to the user command, the updating comprising at least one of:
      moving the graphical representation of the polyhedron to a different one of the individual image areas in the display of the electronic programming guide, and
      changing the size of the graphical representation of the polyhedron within the display of the electronic programming guide.

* * * * *